(12) United States Patent
Van Vooren et al.

(10) Patent No.: US 7,484,750 B2
(45) Date of Patent: Feb. 3, 2009

(54) LIFTING MECHANISM FOR AN AGRICULTURAL HARVESTER

(75) Inventors: Sandor W. Van Vooren, Sijsele-Damme (BE); Dirk J. Desnijder, Wondelgem (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/820,152

(22) Filed: Jun. 18, 2007

(65) Prior Publication Data

US 2007/0294993 A1 Dec. 27, 2007

(30) Foreign Application Priority Data

Jun. 22, 2006 (GB) .................................. 0612364.0

(51) Int. Cl.
*B60D 1/54* (2006.01)
(52) U.S. Cl. .................................................. 280/491.4
(58) Field of Classification Search ............. 280/491.4, 280/490.1, 491.3, 491.5, 497; 172/445, 451; 56/15.6
See application file for complete search history.

(56) References Cited

U.S. PATENT DOCUMENTS

| 4,194,348 | A | * | 3/1980 | Gerlinger | 56/377 |
| 4,329,833 | A | * | 5/1982 | Witzel | 56/228 |
| 5,177,944 | A | * | 1/1993 | Finlay | 56/365 |
| 5,353,580 | A | * | 10/1994 | Wolff | 56/15.2 |
| 5,535,578 | A | * | 7/1996 | Honey | 56/14.9 |
| 6,257,347 | B1 | * | 7/2001 | Campisi | 172/439 |
| RE38,751 | E | * | 7/2005 | Davis | 280/491.4 |

FOREIGN PATENT DOCUMENTS

EP          1530894 A1 *   5/2005

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

An agricultural harvester is disclosed having a crop processor movable into and out of the crop flow path and a service compartment arranged rearwardly of the crop flow path for accommodating an operator. A lifting mechanism is provided in the service compartment which is movable between a first position above the crop processor when the latter is withdrawn from the crop flow path and a second position outside the service compartment.

3 Claims, 1 Drawing Sheet

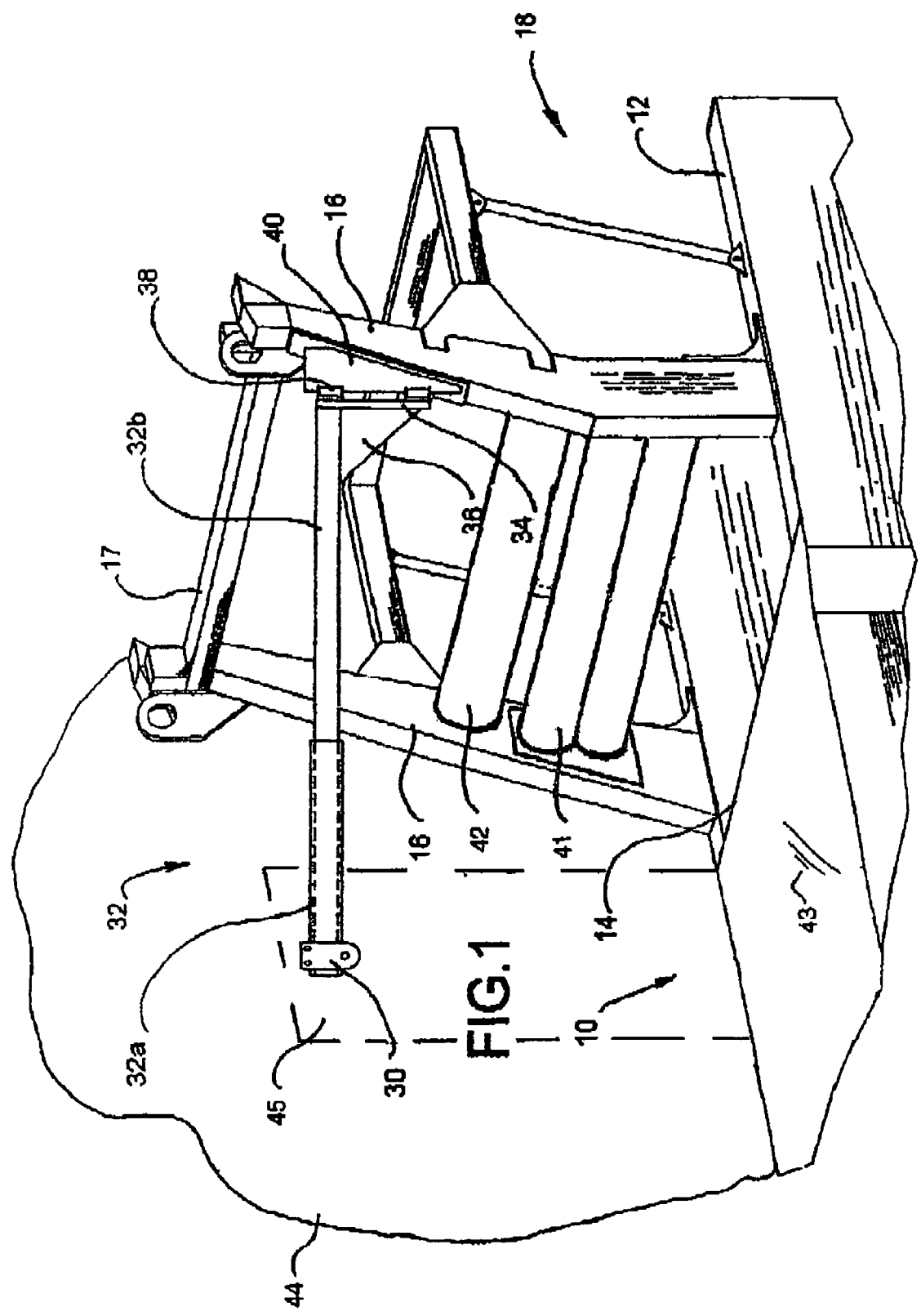

LIFTING MECHANISM FOR AN AGRICULTURAL HARVESTER

CROSS REFERENCE TO RELATED APPLICATIONS

This Patent Application claims priority under 35 U.S.C. § 119 to GB 0612364.0, filed on Jun. 22, 2004 titled, "Lifting Mechanism for an Agricultural Harvester" and having Sandor W. Van Vooren and Dirk J. Desnijder as inventors. The full disclosure of GB 0612364.0 is hereby fully incorporated herein by reference.

FIELD OF THE INVENTION

This invention relates to an agricultural harvester and more particular to a forage harvester of the type having a removable crop processor accessible from a service compartment.

BACKGROUND OF THE INVENTION

Forage harvesters are machines which chop crop gathered from a field into small pieces to produce animal feed. In the case of crops such as grass or alfalfa, these will have been pre-cut and left to dry in the sun, so that the crop only needs to be gathered by the harvester. With other crops, such as maize, the forage harvester may also be required to cut the crop. Thus, the harvesters may be fitted with different headers to suit the crop being harvested.

The crop, whether cut maize or gathered grass, is fed into a rotating knife drum or cutter which comminutes the product. With grass crops, this alone is sufficient to produce the desired forage. However, when harvesting maize for silage purposes, the cutting alone does not suffice due to the presence of kernels in the crop. The kernels need to be cracked in order to release the nutrient, as uncracked kernels are hard for animals to digest. As cutting alone is insufficient to crack all the kernels, the crop is additionally passed through a crop processor which comprises two closely adjacent rollers, typically having serrated surfaces, which rotate such that there is slippage between the adjacent surfaces. The gap between the rollers is set to suit the size of grain passing through and the speed, rotational energy of the rollers, relative movement and serration of the surfaces together ensure cracking of any kernels that are still intact after chopping by the cutter.

The momentum of the maize from the crop processor or the grass from the cutter, as the case may be, carries the crop into an accelerator or blower which then propels it up a tower to a discharge spout through which it is discharged into a wagon or a trailer drawn by a separate vehicle driven alongside the harvester.

When chopping kernel-free crops, such as grass or alfalfa, the crop processor is not required and leaving it in place in the crop flow path results in its rollers being unnecessarily subjected to wear. To avoid such wear, it has previously been proposed to remove the crop processor from the vehicle. For this purpose, it is known to provide to the rear of the crop processor, a service compartment to allow an operator to gain access for servicing of the chopper and the crop accelerator (blower) as well as mounting and removal of the crop processor. However, despite the improvement in accessibility offered by presence of the service compartment, the size and weight of the crop processor makes its removal a difficult and cumbersome task.

EP 1530894 proposes removing the crop processor by lowering it on a strap onto a trolley through a trap door in the floor of the service compartment. A problem with this proposal is that one has still to slide the trolley from under the harvester and such an operation can only safely be carried out in a workshop with level ground.

OBJECT OF THE INVENTION

The present invention seeks therefore to an alternative solution for simplifying the task of removing and remounting a crop processor in an agricultural harvester such as a forage harvester.

SUMMARY OF THE INVENTION

According to the present invention, there is provided an agricultural harvester having a crop processor movable into and out of the crop flow path and a service compartment arranged rearwardly of the crop flow path for accommodating an operator, characterised in that a lifting mechanism is provided which is movable between a first position above the crop processor when the latter is withdrawn from the crop flow path and a second position outside the service compartment.

Preferably, the lifting mechanism is movable to a position beyond the outer bounds of the harvester.

Advantageously, the lifting mechanism is secured to a pivoting mechanism which allows a pivoting movement of the lifting mechanism between the first and the second position.

Preferably, the pivoting mechanism comprises an upright post which is connected to the lifting mechanism and hinges for connection to the harvester.

Advantageously, the lifting mechanism comprises a hoist and a support beam, the hoist being carried on the support beam that is pivotably mounted on the harvester. It is further desirable for the hoist to be slidable along the support beam.

The support beam is preferably itself constructed from two parts that can slide relative to one another or that one can collapse telescopically into the other.

By the provision of a movable hoist in the service compartment, the preferred embodiment of the invention allows an operator, without assistance, to hoist the crop processor out of the crop flow path and to move it out through a side entrance of the service compartment to a position where it can be placed on a platform, for example a fork lift truck, positioned alongside the forage harvester.

When not in use, the hoist and its support beam may be safely stored in the service compartment in a position where it will not interfere with an operator in the service compartment but where it will always be accessible when a need for it arises.

BRIEF DESCRIPTION OF THE DRAWINGS

The invention will now be described further, by way of example, with reference to the accompanying drawing, in which the single FIGURE is a schematic perspective view of a chassis frame of a harvester fitted with a lifting mechanism for carrying a crop processor.

DETAILED DESCRIPTION OF THE PREFERRED EMBODIMENT

The general appearance of a forage harvester is not shown in the drawing as it is well known in the art. Reference may be made, for example, to GB 2323512 or to EP 1530894 (mentioned above) for a general description of a forage harvester to which the present invention is applicable.

A header is fitted to the front of a forage harvester for gathering the crop, the header constituting the first part of the crop flow path. A feed system centers the crop that is gathered across the entire width of the header and drives it into a chopper which has knives for comminuting the crop into small pieces. If the crop does not have kernels that need to be cracked, a crop accelerator, or blower, propels the chopped crop through a tower to a discharge spout, the latter constituting the last part of the crop flow path.

If the crop does contain kernels that need to be cracked to make them digestible by animals, a crop processor is mounted between the chopper and the accelerator to crush the kernels in the manner earlier described. The crop processor is both bulky and heavy and the present invention is concerned with simplifying the tasks of mounting it in and removing it from the crop flow path.

The drawing shows the front end of the chassis frame 10 of a forage harvester. The frame is viewed in the drawing looking towards the front while standing to the right hand side of the harvester. The frame includes two elongate girders 12 that extend along the length of the harvester and are interconnected by a cross brace 14. Two pillars 16 extend upwards from the girders 12 and inclined slightly towards the front of the harvester. The upper ends of the two pillars are also interconnected by a cross brace 17.

The front end 18 of the chassis frame is designed to be connected to any one of a plurality of different headers (not shown) each suited to a different type of crop. The gap between the girders 12 forward of the cross brace 14 accommodates the feed system and the chopper while the crop processor 41 and the crop accelerator 42 are supported by the pillars 16 above the chopper. To the rear of the pillars 16, there is a service compartment with a side opening entrance door.

The floor of the service compartment 43 rests on the girders 12. The crop flow path lies at the front end of the service compartment and the power plant of the forage harvester lies to the rear of the compartment. While standing within the service compartment, an operator can adjust and reposition various belts that serve to drive the chopper, the accelerator 42 and the crop processor 41 and can move the crop processor 41 in and out of the crop flow path between the chopper and the accelerator 42.

As so far described, the chassis frame and the forage harvester are conventional and it is believed that they will be readily understood without the need for more detailed explanation.

The invention is concerned with the manoeuvring of the crop processor when it is being mounted and removed. To assist in the task the illustrated preferred embodiment of the invention includes a lifting mechanism comprising a hoist 30 that is capable of supporting the weight of the crop processor. The hoist is mounted on a beam 32 comprised of two telescopically collapsible parts 32a and 32b. The hoist 30 can slide on rollers on the front part 32a of the beam, and the part 32a can itself slide smoothly on rollers relative to the other part 32b.

The part 32b is secured to a pivoting mechanism comprising an upright post 34 and a triangular plate 36. The triangular plate 36 is welded to the post 34 and the beam part 34b 32b to act as a strengthening brace. The post 34 is pivoted about a generally vertical axis about two hinges 38 that are mounted to a triangular plate 40 welded to one of the pillars 16.

The ability of the hoist 30 to slide along the beam 32 and the collapsibility of the beam itself together ensure that the hoist can be moved with little effort from the illustrated extended position to a collapsed position where it lies close to the tip of the triangular plate 36. Further, because the beam is free to pivot about the vertical axis of the hinges 38, the locus of the hoist is a large horizontal arc which covers the floor area of the service compartment 43. The beam 32 can also pass through and protrude from the side entrance 45 of the service compartment wall 44 to allow the hoist 30 to reach a point beyond the outer bounds of the harvester, that is to say a point beyond the volume swept by the harvester as it moves. Depending on the construction of the side panels of the forage harvester, it may be required to remove a part of the side panel to allow the movement beyond the outer bounds of the harvester.

The hoist can be used to move the crop processor in and out of the service compartment of the harvester. Before disconnecting the crop processor from the crop flow path, the hoist 30 is positioned above it and operated to take its weight. The hoist 30 may be electrically powered or it may comprise a manual winching system comprising a chain or rope passing around pulleys. After the crop processor has been separated from the crop flow path, it can be manoeuvred without much effort by sliding the hoist towards or away from the pivot axis and/or by (simultaneously) rotating the beam 32 about the pivot axis.

Because the hoist can reach outside the service compartment, it can be used to carry the crop processor to a position where is can be lowered by the hoist onto a platform positioned alongside the harvester. The platform may be a trolley or more conveniently a fork lift truck or a pick-up truck. Once one has finished using the hoist to carry the crop processor outside the service compartment, it can be safely stored away, out of harm's way, within the service compartment.

The above steps can of course be reversed when the crop processor is to be remounted in the flow path. In this case, after a trolley, a fork lift truck or a pick-up truck has been used to bring the crop processor to the side of the harvester by the entrance to the service compartment, the hoist is pulled out to overlie and then used to lift it off the trolley and reposition it in the crop flow path.

The hoist need not of course only be used to carry a crop processor but it can be used to transfer any heavy item into and out of the service compartment. Normally the crop processor is formed as a separate unit from the crop accelerator but because the hoist allows heavier items to be manoeuvred safely, it makes it possible for the crop processor and the accelerator to be formed as one structural unit, which can be replaced by a unit comprising only a crop accelerator when there is no requirement for the crop processor.

The invention claimed is:

1. An agricultural harvester having a crop processor movable into and out of the crop flow path, the agricultural harvester comprising:
   a service compartment arranged rearwardly of the crop flow path for accommodating an operator; and
   a lifting mechanism further including,
   an upright post extending substantially vertically from the harvesting machine,
   a telescoping beam extending substantially horizontally from the upright post, wherein the beam is pivotally connected to the post to allow the pivoting movement between a first and second position, further wherein the beam telescopically moves between an extended position and a collapsed position, and
   a hoist slidably mounted to the beam, wherein the hoist has rollers for slidable movement along the beam, such that the hoist is adjacent to the post when the beam is in the collapsed position, further wherein the beam in the extended position passes through an opening in a side entrance of the service compartment so that a distal end of the beam protrudes beyond the outer bounds of the harvesting machine, thereby allowing the hoist to move the crop processor in and out of the service compartment of the harvesting machine.

2. An agricultural harvester as claimed in claim 1, wherein the crop processor and a crop accelerator are combined with one another to form a single structural unit, the single structural unit being pivotably movable by the lifting mechanism between the first position inside the harvester and the second position outside the harvester.

3. An agricultural harvester as claimed in claim 1, wherein the support beam is constructed from two parts that can slide relative to one another or that one can collapse telescopically into the other.

* * * * *